(12) United States Patent
Gleyal-Martinez

(10) Patent No.: US 11,691,333 B2
(45) Date of Patent: Jul. 4, 2023

(54) ADDITIVE MANUFACTURING MATERIALS SYSTEM

(71) Applicant: Zephyros, Inc., Romeo, MI (US)

(72) Inventor: Sylvain Gleyal-Martinez, Rochester, MI (US)

(73) Assignee: ZEPHYROS, INC., Romeo, MI (US)

( * ) Notice: Subject to any disclaimer, the term of this patent is extended or adjusted under 35 U.S.C. 154(b) by 390 days.

(21) Appl. No.: 15/776,340

(22) PCT Filed: Nov. 17, 2016

(86) PCT No.: PCT/US2016/062517
§ 371 (c)(1),
(2) Date: May 15, 2018

(87) PCT Pub. No.: WO2017/087663
PCT Pub. Date: May 26, 2017

(65) Prior Publication Data
US 2018/0326659 A1 Nov. 15, 2018

Related U.S. Application Data

(60) Provisional application No. 62/383,840, filed on Sep. 6, 2016, provisional application No. 62/256,494, filed on Nov. 17, 2015.

(51) Int. Cl.
| | | |
|---|---|---|
| *B29C 64/118* | (2017.01) | |
| *B33Y 70/00* | (2020.01) | |
| *B33Y 10/00* | (2015.01) | |
| *B33Y 30/00* | (2015.01) | |
| *B29C 64/209* | (2017.01) | |
| *B29K 63/00* | (2006.01) | |

(52) U.S. Cl.
CPC .......... *B29C 64/118* (2017.08); *B29C 64/209* (2017.08); *B33Y 10/00* (2014.12); *B33Y 30/00* (2014.12); *B33Y 70/00* (2014.12); *B29K 2063/00* (2013.01)

(58) Field of Classification Search
None
See application file for complete search history.

(56) References Cited

U.S. PATENT DOCUMENTS

| | | | |
|---|---|---|---|
| 3,317,471 A | 5/1967 | Johnson et al. | |
| 3,547,881 A * | 12/1970 | Parry .................... | C07D 303/26 |
| | | | 568/640 |
| 4,438,254 A | 3/1984 | Doorakian et al. | |
| 4,612,156 A * | 9/1986 | Heinemeyer ...... | C08G 59/1433 |
| | | | 264/176.1 |
| 4,647,648 A | 3/1987 | Silvis et al. | |
| 4,992,525 A | 2/1991 | Kriessmann et al. | |
| 5,115,075 A | 5/1992 | Brennan et al. | |
| 5,164,472 A | 11/1992 | White et al. | |
| 5,275,853 A | 1/1994 | Silvis et al. | |
| 5,401,814 A | 3/1995 | Schomaker et al. | |
| 5,464,924 A | 11/1995 | Silvis et al. | |
| 5,648,401 A | 7/1997 | Czaplicki et al. | |
| 6,011,111 A | 1/2000 | Brennan et al. | |
| 6,730,713 B2 | 5/2004 | Czaplicki | |
| 6,803,004 B1 | 10/2004 | Bochan et al. | |
| 2007/0027233 A1 | 2/2007 | Yamaguchi et al. | |
| 2007/0270515 A1 | 11/2007 | Chmielewski et al. | |
| 2008/0063871 A1 * | 3/2008 | Jung ..................... | C09J 163/00 |
| | | | 524/588 |
| 2009/0298974 A1 | 12/2009 | Chmielewski et al. | |
| 2013/0186549 A1 * | 7/2013 | Comb .................... | B33Y 30/00 |
| | | | 156/62.8 |
| 2014/0061974 A1 | 3/2014 | Tyler | |
| 2018/0037695 A1 | 2/2018 | Czaplicki et al. | |
| 2019/0001642 A1 | 1/2019 | Meistermann et al. | |

FOREIGN PATENT DOCUMENTS

| | | | |
|---|---|---|---|
| CN | 103 756 293 A | 4/2014 | |
| CN | 104626587 A | 5/2015 | |
| KR | 101 391 293 | 5/2014 | |
| WO | 98/14498 A1 | 4/1998 | |
| WO | 2008/010823 A2 | 1/2008 | |
| WO | WO-2015077262 A1 * | 5/2015 | ........... B29C 64/118 |
| WO | 2015/134316 | 9/2015 | |
| WO | 2017/083690 A1 | 5/2017 | |

OTHER PUBLICATIONS

Batzer, H. and Zahir, S.A. (1975), Studies in the molecular weight distribution of epoxide resins. I. Gel permeation chromatography of epoxide resins. J. Appl. Polym. Sci., 19: 585-600 (Year: 1975).*

(Continued)

*Primary Examiner* — Megan McCulley
(74) *Attorney, Agent, or Firm* — The Dobrusin Law Firm, P.C.

(57) ABSTRACT

The present teachings contemplate additive manufacturing of articles, such as articles made by layer-by-layer deposition of one or more reformable resin polymeric feed material. In particular the invention relates to a feed material system for preparing an article by additive manufacturing, comprising one or more preform elements of a feed material (i) formed of a reformable resin polymeric material including a polymer backbone having a plurality of repeat units each having ether linkages (e.g. derived from an epoxy containing reactant), and optionally one or more pendant hydroxyl moeities; and (ii) which is capable of transforming from a generally non-tacky first state to a second state in which the material is softened, upon application of heat, relative to the first state and is at least partially tacky in the second state to permit it to adhesively bond to a surface upon which it is deposited for forming a layer on the surface, to a third state in which the material is harder than when in the second state but remains able to further soften upon application of heat, wherein the resulting adhesive bond is substantially devoid of any cross-linking between the layer and the surface, and wherein the one or more elements of the feed material are in a form adapted to be dispensed by an additive manufacturing apparatus.

20 Claims, No Drawings

(56) References Cited

OTHER PUBLICATIONS

Database WPI Week 201440, Thomson Scientific, London, GB, AN 2014-L83390, XP002766812.
Database WPI Week 201442, Thomson Scientific, London, GB; AN 2014-J48657 XP002766813.
PCT Search Report & Written Opinion dated Feb. 20, 2017, Application No. PCT/US2016/062517 of this form with next communication to applicant.
Chinese First Office Action dated Dec. 17, 2019, Application No. CN201680067403.5.

* cited by examiner

ADDITIVE MANUFACTURING MATERIALS SYSTEM

TECHNICAL FIELD

The present teachings relate generally to additive manufacturing, more particularly to additive manufacturing with a reformable resin feed material system, particularly a system that broadly contemplates particular ingredients, reactions and reaction products associated with polymers having an epoxide functionality for imparting at least one mechanical characteristic consistent with epoxy thermoset materials, and at least one processing (e.g., elevated temperature processing) characteristic typically associated with thermoplastic materials (e.g., a glass transition temperature); and still more particularly, the present teachings relate to additive manufacturing with a thermoplastic polyether feed material, such as a thermoplastic epoxy polymer feed material.

BACKGROUND

Thermoplastic materials are often used in three dimensional print applications. However, commonly utilized thermoplastics include a number of drawbacks including but not limited to the incompatibility of typical thermoplastics with secondary materials (in particular epoxy-based including adhesives and expandable foams) and the relative lack of structural rigidity.

Thermoplastic polymers having at least one epoxide group have been described in U.S. Pat. Nos. 5,115,075; 4,438,254; 6,011,111; and WO 98/14498 (see, e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 2007/0270515 (Chmielewski et al.), incorporated by reference for all purposes.

The use of such thermoplastic polymers in a composite material has been disclosed in WIPO Patent Application WO/2008/010823 (addressing in situ reaction of an epoxy and an amine after impregnation), incorporated by reference herein. See also, United States Patent Application No. 2009/0298974 (incorporated by reference).

U.S. Pat. Nos. 4,992,525; 5,648,401; and 6,730,713 may also be relevant to the present teachings, and are all incorporated by reference for all purposes.

Notwithstanding the above, there remains a need for a system for additive manufacturing that employs readily melt processable and/or dispersable polymeric feed materials that may exhibit attractive bonding characteristics, and relatively good mechanical properties (e.g., tensile strengths, elongation, and/or tensile modulus). There also remains a need for additional feed materials that can be fibrillated to form one or more filaments, that can be pelletized, and/or that can be particulated, for rendering the materials suitable as a feed material for additive manufacturing processes.

SUMMARY

The teachings herein address the surprising recognition that a certain class of polymeric materials are particularly attractive for additive manufacturing, in which an article is manufactured layer-by-layer. The class of polymeric materials can be generally referred to as a reformable resin material. The materials exhibit a unique combination of characteristics. By way of illustration, the materials are polymeric and include a linear backbone a plurality of repeat units each having ether linkages, and optionally one or more pendant hydroxyl moieties. The polymeric materials may include reaction products derived from a reactant having an epoxide functionality. The polymeric materials are such that they are capable of exhibiting at least one mechanical characteristic consistent with epoxy thermoset materials, and at least one processing (e.g., elevated temperature processing) characteristic typically associated with thermoplastic materials (e.g., a glass transition temperature). The polymeric materials are also such that they can be processed into any of a number of preforms (e.g., pellets, particulates, fibers, or some other form of discrete elements) that make them attractive as additive manufacturing feed materials. By way of illustration it is envisioned that the materials of the present teachings can be made into one or more preform and employed as a feed material (e.g., in a method in which a feed material is continuously fed to a dispenser of an additive manufacturing apparatus, e.g., as an elongated preform that is extruded for layer by layer buildup of an article, as a dispersed element in a printing ink or other liquid dispersion adapted for layer by layer buildup of an article, as a pellet or other particulated form for delivery to an extruder die configured for layer by layer buildup of an article.

The teachings contemplate using a feed material that is derived from a suitable reaction to form a material useful in accordance with additive manufacturing. Such a material may be a thermoplastic polyether material. For instance, such a material may be a polymeric material having thermoplastic processing characteristics and including a polymer backbone having a plurality of repeat units each having ether linkages, and optionally one or more pendant hydroxyl moeities. Feed materials according to the present teachings may be free of crosslinking, or of any thermoset portion chemically bonded to a generally linear backbone. Feed materials according to the present teachings may be substantially devoid of crosslinking, or of any thermoset portion chemically bonded to a generally linear backbone.

The teachings envision a feed material system for preparing an article by additive manufacturing, comprising one or more preform elements of a feed material (i) formed of a reformable resin polymeric material including a polymer backbone having a plurality of repeat units each having ether linkages (e.g., derived from an epoxide-containing reactant), and optionally one or more pendant hydroxyl moieties; and (ii) which is capable of transforming from a generally non-tacky first state to a second state in which the material is softened, upon application of heat, relative to the first state and is at least partially tacky in the second state to permit it to adhesively bond to a surface upon which it is deposited for forming a layer on the surface, to a third state in which the material is harder than when in the second state but remains able to further soften upon application of heat, wherein the resulting adhesive bond is substantially devoid of any cross-linking between the layer and the surface, and wherein the one or more elements of the feed material are in a form adapted to be dispensed by an additive manufacturing apparatus.

The teachings also envision a method of making a three dimensional article, comprising the steps of (a) depositing a first layer onto a substrate, the first layer being made of a first reformable resin polymeric feed material that has a polymer backbone having a plurality of repeat units each having ether linkages (e.g., derived from an epoxide-containing reactant), and optionally one or more pendant hydroxyl moieties; (b)

depositing a second layer onto the first layer, the second layer being made of a second reformable resin polymeric feed material that has a polymer backbone having a plurality of repeat units each having ether linkages (e.g., derived from an epoxide-containing reactant), and optionally one or more pendant hydroxyl moeities, the second reformable resin polymeric material being the same as, or different from, the first reformable resin polymeric material; and thereafter repeating step(a), step(b) or both steps for consecutively depositing a plurality of additional discrete layers of the first reformable resin polymeric feed material, the second reformable resin polymeric feed material or both, until a desired three dimensional material is formed.

One unique feature of the teachings generally herein is that the feed materials and the method of the teachings allows for layer-by-layer buildup of an article by additive manufacturing in the substantial absence of cross-linking between adjoining layers.

Another unique feature of the teachings generally herein is that the feed materials and the method of the teachings allows for layer-by-layer buildup of an article by additive manufacturing with a resulting article having a generally stable structure that is substantially devoid of internal stresses occasioned by thermal cycling (e.g., the effect of any feed material shrinkage and/or the coefficient of thermal expansion of the feed material does not materially contribute to internal stress build-up in the resulting article.

The feed material (and/or materials upon employment in an article made by additive manufacturing herein) may exhibit a tensile strength at yield (according to ASTM D638-14) of at least about 15 MPa (e.g., at least about 30 MPa or 45 MPa), a tensile elongation strength at break (according to ASTM D638-14) of at least about 40 MPa (e.g., at least about 45 or 55 MPa); an elongation at break (according to ASTM D638-14) of at least about 15% (e.g., at least about 20%, 25 or 30%); and/or a tensile modulus of elasticity (according to ASTM D638-14) of at least about 0.5 GPa, (e.g., at least about 1 GPa, 1.8 GPa, or 2.7 GPa).

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Nos. 62/256,494, filed Nov. 17, 2015 and 62/383,840, filed Sep. 6, 2016 the contents of these applications being hereby incorporated by reference herein for all purposes.

The present teachings envision a unique material system directed toward the realization of a material having (i) various processing characteristics (e.g., viscosity, melt flow rate, or other characteristics suitable for melt processing, such as by extrusion) typical of a thermoplastic polymeric material, and (ii) various performance characteristics (e.g., rigidity, adhesion, elongation, toughness, etc.) typical of a thermoset polymeric material, such as an epoxy. The material system encompasses within its scope the use of a feed material that is a reaction product (which is typically expected to be a polymeric material) arising from a reaction of a unique combination of ingredients in a reaction mixture.

The feed material may exhibit a glass transition temperature (TO as measured by differential scanning calorimetry according to ASTM E1356-08(2014) of from about 60° to about 90° (e.g., about 80° C.). The polymer or any other such reaction product may exhibit a $T_g$ greater than about 90° C., about 100° C., about 110° C., or about 120° C.

The feed material may be such that it can be processed in a softened state, pursuant to which it has a viscosity that is lower than its viscosity at about room temperature. Thus, upon exposing at least a portion of the polymer or any other such reaction product material to an elevated temperature e.g., a temperature above the $T_g$ of the material (such as a temperature above about 70° C., about 85° C. or about 90° C., and/or below about 300° C., about 250° C., about 230° C., or about 210° C.), for sufficient duration (e.g., for a period of about 0.1 to about 150 seconds or about 1 to about 15 seconds or longer) so that the material becomes capable of flowing to enable it to be generally continuously deposited as either a droplet, an elongated bead or strip, or a combination thereof. Moreover, upon exposing the feed material or any other such reaction product material to an elevated temperature (such as a temperature above about 70° C., about 85° C. or about 90° C., and/or below about 300° C., about 250° C., about 230° C., or about 210° C.), and after being dispensed, the material is capable of adhering to an adjoining layer of material (which may be the same composition or different from the polymer or any other such reaction product material), and retaining an adhesive bond upon cooling to about room temperature or to a temperature that is below the $T_g$ of the material. Adhesion between adjoining layers is possible in the substantial absence of any crosslinking of materials within or between adjoining layers. Yet, attractive mechanical properties consistent with certain thermoset polymers (e.g., epoxies) are possible.

The feed material may be part of a multiple phase material for use with the additive manufacturing teachings herein. For example, it may be a matrix phase of a dispersed phase composite material. The dispersed phase may include fibers, particles, or some other form of the dispersed material (which dispersed material may be a metal, a ceramic, a naturally occurring material, a synthetic material, a polymeric material, or otherwise). The feed material may be, or become, some or all of a layer of a laminate composite material.

The feed material may be a one part material. For instance, at the time when employed as a feed material (e.g., when it is passed through a die, a nozzle, a printhead, or otherwise handled for forming an article in a series of successively applied layers) the feed material may be a pre-existing one part material. It is possible that the feed material may be formed in situ during or after a deposition step of one or more of its reactants. For example, a feed material may result by simultaneously feeding two or more reactants to a dispensing device at an additive manufacturing site. A reaction may take place prior to the reactants entering the dispensing device, within the dispensing device, and/or after exiting the dispensing device.

The feed material may be employed to form an article that includes at least one suspended structural feature (such as a bridge, a cantilever, an overhang, an undercut or the like). A method to make such an article may employ the teachings herein throughout, and employ or not employ at least one removable support structure to assist in such a build. The removable support structure itself may be an article prepared by the additive manufacturing teachings herein. As to the latter, the article being built and the removable support structure may employ materials that avoid bonding to each other.

At present, any reaction suitable for achieving the desired resulting characteristics in a polymeric material (e.g., a thermoplastic polyether) may be employed. At least two reaction approaches are contemplated as within the scope of the present teachings. Either or both in combination may be employed. In a first approach, a reaction is employed to result in a poly(hydroxyaminoether), (PHAE). In a second approach, a reaction is employed to result in a thermoplastic epoxy polymer that is essentially devoid of nitrogen and/or an amine moiety along its backbone.

Referring in more detail to the first approach, the material that is employed in accordance with the present teachings may be and/or may include a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

Exemplary materials may be made with a difunctional epoxy resin and a primary amine, e.g., a reaction between diglycidyl ether of bisphenol A and monoethanolamine. For some applications that may require a higher glass transition temperature (Tg), it is contemplated that some or all of the diglycidyl ether of bisphenol A may be replaced by an epoxy monomer with less mobility. Such epoxy monomers may include diglycidylether of fluorene diphenol or 1,6 napthalene diepoxy. Also, it is contemplated that where fire resistance is desired, some or all of the diglycidyl ether of bisphenol A may be replaced by a brominated bisphenol A epoxy resin. In accordance with this approach materials be prepared by reacting a diglycidyl ether of dihydric aromatic compounds such as the diglycidyl ether of bisphenol A, or a diepoxy-functionalized oly(alkylene oxide) or mixture thereof with a primary amine or a secondary diamine or a monoamine functionalized poly(alkylene oxide) or mixture thereof.

Such materials generally have a relatively high flexural strength and modulus, often much higher than typical polyolefins (i.e. polyethylene and polypropylene). Such materials may be melt processable at temperatures such as a temperature above about 70° C. about 85° C. or about 90° C., and/or below about 300° C., about 250° C., about 230° C., or about 210° C.

As the teachings herein illustrate, other epoxide-containing moieties may be employed. Epoxide-containing moieties may include at least one mono-functional epoxide and/or a di-functional epoxide ("diepoxide"). Among the various diepoxides that can be employed in the teachings, there may be a diglycidyl ether of a dihydric phenol (e.g., resorcinol, biphenol or bisphenol A). Any epoxide-containing moiety herein may be an aliphatic and/or an aromatic epoxide.

An illustration of one possible example of such a material may be a reaction product of a diglycidyl ether of a dihydroxy organic compound) and an amino, namely one having two amino hydrogens per molecule (e.g., a reaction product of a diglycidyl ether of bisphenol A and a monoethanolamine), as described for example at col. 1, line 4 through col. 2, line 52 in U.S. Pat. No. 3,317,471 (incorporated by reference).

Additional details of suitable reactants and conditions for this first approach can be found in Published United States Application No. 20070270515 (see, e.g., paragraphs [0014]-[0025]), U.S. Pat. No. 5,164,472 (see, e.g., cols. 2-4); and U.S. Pat. No. 3,317,471 (see, e.g., col. 1, line 4 through col. 2, line 52), all incorporated by reference.

Referring in more detail to the second approach, without limitation, this approach may be employed in instances when it is desired to employ a material having a relatively high glass transition temperature. For this approach, it is contemplated that a reaction of at least one diepoxide and at least one bisphenol. The at least one diepoxide (e.g., at least one diglycidyl ether) and at least one bisphenol are reacted (in molar amounts) in a ratio of the at least one diepoxide to the at least one bisphenol in a ratio of about 4:1 to about 1:4 (e.g., about 2:1 to about 1:2, or even about 1:1). In regard to the ingredients of a reaction mixture, the at least one diepoxide may have a molecular weight ranging from about 130 to about 460 g/mol (e.g., about 220 to about 350). The at least one diepoxide may include at least one ether linkage. The at least one diepoxide may include at only two ether linkages. The at least one diepoxide may include at least one, two or more phenyl moieties. For example, it may have only two phenyl moieties. The at least one diepoxide may include at least one ether linkage between at least one phenyl moiety and an epoxide functional group. The diepoxide may be selected from resorcinol diglycidyl ether, diglycidyl ether of bisphenol A ("DGEBA"), bisphenol F diglycidyl ether, bisphenol A propoxylate diglycidyl ether, or any combination thereof. The material of the present teachings may employ as its at least one bisphenol ingredient a bisphenol that has a molecular weight of about 200 to about 360 g/mol. The at least one bisphenol may be selected from 4,4'-(1-phenylethylidene) bisphenol; 4,4'-sulfonylbisphenol; or a combination thereof.

For this material, it is possible that the reaction employs a catalyst. Though it is possible that no catalyst is employed. The amount of any catalyst employed may be an amount sufficient for catalyzing the reaction of the diepoxide and the bisphenol. For example, it may range from about 1 part by weight catalyst to about 0.001 to about 8 percent by weight of catalyst relative to the total amount of diepoxide and bisphenol of the starting reaction mixture, e.g., from about 0.01 percent by weight catalyst to about 5 percent by weight of both of the total diepoxide and bisphenol of the starting reaction mixture. The amount of catalyst may be toward the higher end of the range, e.g., from about 3.5 percent by weight catalyst to about 7.5 percent by weight of both of the total diepoxide and bisphenol of the starting reaction mixture. The amount of any catalyst employed may be below about 10 mol percent of the entire reaction mixture.

It is possible to react a reaction mixture of at least one diepoxide, and at least one bisphenol, to arrive at the material of the present teachings. For instance, a reactant mixture may include, consist essentially of (e.g., at least about 85% by weight, about 90% by weight, or about 95% by weight of) the reactants (exclusive of catalyst), or consist of at least one diepoxide, and at least one bisphenol. The reactant mixture may include a catalyst or a catalyst mixture.

For instance, the catalyst mixture may include, consist essentially of (e.g., at least about 85% by weight, about 90% by weight, or about 95% by weight of) the catalyst, or consist of a non-iminium phosphine catalyst (e.g., triphenylphosphine (PPH3)). The reaction may be in the substantial absence of any solvent, namely a solvent in addition to the main reactants, e.g., it is in the substantial absence of a solvent added to a mixture with the at least one diepoxide and/or the at least one bisphenol. The reaction may be in the substantial absence of any iminium catalyst and/or any other catalyst.

Approaches other than the above to reactions for making materials useful for the present teachings (e.g., a thermoplastic polyether) may include one or more reactions selected from the above first and second approaches, or (a) a reaction product of diglycidyl ether of a biphenol with a dihydroxybiphenyl, in which the repeating unit of the polyhydroxyether contains a hydrocarbon connecting group and a hydrocarbon or halogen substituted phenylene radical, as described in U.S. Pat. No. 4,647,648 (incorporated by reference);

(b) a reaction product of a diglydicyl ether of certain amido-dihydric phenols and N-substituted dihydric phenols, as described in U.S. Pat. No. 5,115,075 (incorporated by reference)

(c) a reaction product of a dihydric phenol (e.g., a diglycidyl ether of one or more of bisphenol ketone, bisphenol sulfone, resorcinol, or hydroquinone) and at least one other dihydric phenol such as 4,4'-ispropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol, or the like, as described in U.S. Pat. No. 5,164,472 (incorporated by reference);

(d) a reaction product (e.g., a reactive extrusion product) of a diglycidyl ether of a dihydric phenol with an amine having only two hydrogens under conditions sufficient to form the polyetheramine, as described in U.S. Pat. No. 5,275,853 (incorporated by reference);

(e) a reaction product of dihydric phenol and a diepoxide in the presence of a catalyst selected from bis(trihydrocarbylphosphoranylidene)ammonium salt, bis[tris(dihydrocarbylamino)phosphoranylidene]ammonium salt, or tetrakis[tris(dihydrocarbylamino)phosphoranylideneamino] phosphonium salt, as described in U.S. Pat. No. 5,401,814 (incorporated by reference);

(f) a reaction product prepared by reacting (1) a primary amine or bis(secondary) diamine with (2) a diglycidyl ether and (3) an amine- or epoxy-functionalized poly(alkylene oxide), as described in U.S. Pat. No. 5,464,924 (incorporated by reference);

(g) a reaction product of a compound having an average of more than one vicinal epoxide group per molecule and a polyhydric phenol or thiophenol, in the presence of a catalytic amount of a tetrahydrocarbyl phosphonium salt in an essentially anhydrous medium, as described in U.S. Pat. No. 4,438,254 (incorporated by reference);

(h) a reaction product of a diepoxide (e.g., diglycidyl ethers of dihydric phenols) and a difunctional species selected from dihydric phenols, dicarboxylic acids, bis-secondary amines, primary amines, dithiols, disulfonamides, and compounds that contain two different functionalities capable of reacting with epoxide groups, as described in U.S. Pat. No. 6,011,111 (incorporated by reference); or (j) a hydroxy-phenoxyether reaction product polymer prepared by reacting a difunctional species (that is, a species having two reactive groups), such as a dihydric phenol, with a diepoxide (that is, a compound having two epoxide functionalities) under conditions sufficient to cause the hydroxyl moieties to react with the epoxy moieties to form ether linkages, as described in WO98/14498 (incorporated by reference).

The teachings herein make advantageous use of reformable resin feed materials for use in additive manufacturing applications, such as for printing by the use of filaments (e.g., thermoplastic epoxy filaments). The resulting additive manufacturing articles not only can be made by taking advantage of the beneficial processing characteristics consistent with thermoplastics. But, upon fabrication of the articles by additive manufacturing, that may be further modifiable by forming or otherwise shaping, by heating the additive manufacturing article to a temperature above which at least a portion of the reformable resin feed that is incorporated into the article is elevated above its $T_g$. Thereafter, the article can be cooled so the material is below the $T_g$, thereby causing the material to retain its desired shape.

It may also be possible to employ one or more reactants that permit an optional delayed cross-linking reaction to occur. For example, one or more of the reactants may include one or more moieties that are capable of reacting (e.g., in the presence of a certain stimulus, such as a predetermined electromagnetic radiation (e.g., infrared, ultraviolet, microwave or otherwise) for achieving cross-linking of a molecule with in itself and/or with an adjoining molecule. Desirably such radiation affords cross-linking while maintaining a resulting article made by additive manufacturing to remain below its $T_g$. Thus, it may be possible that crosslinking may be realized within and/or between adjoining layers. Thus, the teachings contemplate an optional step of causing at least a portion of an article made with the teachings to include cross-linking, such as by causing a cross-linking reaction to occur (e.g., by subjecting feed material and/or the resulting article to electromagnetic radiation as described).

The teachings contemplate that any of a variety of steps may be employed. For instance, a first reformable resin polymeric feed material, a second reformable resin polymeric feed material, or both may be one of the polymeric material disclosed in the present teachings, or some other polymeric material. Any of the depositing steps may be performed by feeding a fibrillated form of polymeric feed material through a die head and heating at least a portion of fibrillated form of the polymeric material to a temperature above the $T_g$ of the polymeric material.

Any step of depositing a second layer onto a first layer may be performed by feeding a fibrillated form of polymeric feed material through a die head and heating at least a portion of fibrillated form of the polymeric material to a temperature above the $T_g$ of the polymeric feed material, wherein at the time the heated portion contacts a previously deposited layer, the heated portion is at a temperature higher than the $T_g$ of such polymeric feed material.

Any of the feed materials may be subjected to heating, but to a relatively low temperature so that a deposition rate can be relatively high; that is, the temperature may be sufficiently high to elevate at least a portion of the feed material to a temperature above its $T_g$, so it can flow and/or exhibit some tack for adhesion. However, the temperature is not so high that during cooling to ambient (e.g., room temperature)

there is sufficient time so that the material (or a portion thereof) will sag (or otherwise lose its shape) under its own weight or the weight of one or more subsequently deposited layers. Thus, various of the feed materials of the teachings allow an appropriate flowability, tack and hardening rate that layer by layer build-up of an article by additive manufacturing is readily possible. Rapid throughput rates are possible with the present teachings. For example, one or more depositing steps may performed at a throughput rate of at least about 0.5 kg/minute of feed material, about 1 kg/minute of feed material, or about 3 kg/minute of feed material, or higher.

It is possible that the maximum temperature to which any of the polymeric feed materials are subjected is below about 110° C. (e.g., below about 100° C., or below about 90° C.). Of course, higher $T_g$ materials may be employed from the teachings herein, and higher temperatures thus may be employed.

It is envisioned that additive manufacturing may be achieved by a method that includes dispensing a feed material through a nozzle. For example, any of the reformable resin polymeric feed materials herein may be deposited through a nozzle opening and the reformable resin polymeric materials upon exiting the nozzle opening may be at least twice the velocity of the reformable resin polymeric materials prior to being introduced into the nozzle.

The feed material may exit a nozzle opening in a solid state or a fluidic state. The feed material may exit a nozzle opening in a heated state or an unheated state. It is possible that the feed material may be deposited by a cold spraying step. For instance, at least one of the depositing steps includes depositing a layer by cold spraying unheated feed material (e.g., when the feed material exits a nozzle of a deposition device the maximum temperature of the feed material is below the $T_g$ of the feed material (e.g., by at least about 25° C., about 35° C. or about 45° C.)).

The teachings envision generally that when making an article herein by additive manufacturing, there may be one or more steps for controlling a temperature difference as between a previously applied layer (e.g., an immediately preceding layer) and a layer being applied. For instance, it may be possible that the temperature difference is such that an external surface of a previously applied layer (e.g., an immediately preceding layer) is below its $T_g$ and at least an external surface of the layer being applied is above its $T_g$. There may be a temperature differential as between the external surface temperatures of successively applied layers (at the time when the later applied layer is applied) of at least about 5° C., about 15° C. or about 25° C. There may be a temperature differential as between the external surface temperatures of successively applied layers (at the time when the later applied layer is applied) of less than about 100° C., about 80° C. or about 60° C.

The processing temperature may affect the forming process in that the viscosity of the reformable resin polymeric feed materials my require adjustment to form the desired form (e.g., filament) and the resulting article. Specifically, the materials may require processing at a temperature of at least 150° C., at least 170° C., at least 190° C. or even at least about 200° C. At lower processing temperatures the viscosity of the materials may be too high for formation into filaments or too high for printing. In one embodiment it is possible that the material is formulated to have a lower viscosity (sufficient for printing and/or forming into filaments) even at temperatures below 200° C., below 170° C., or even below 150° C. However, the temperature for processing the RER materials may continue to be below that of the temperature required to process other materials such as typical thermoplastics. The use of lower processing temperatures reduces the risk of thermal stability of the materials during processing and also allows for easier cooling of the material. Cooled materials minimize any unwanted material tackiness.

The teachings herein also envision that any method described may include a step of controlling (i) a deposition rate of one or more of the reformable resin polymeric feed materials; (ii) temperature of a deposited mass; or both (i) and (ii), to allow heat of a deposited mass to dissipate sufficiently so that at least a portion of (a) the shrinkage of the mass that occurs takes place during solidification, and/or (b) contraction from any expansion that occurs due to elevated temperature (due to the coefficient of thermal expansion of the reformable resin polymeric feed materials), occurs prior to deposition of a subsequent layer.

In accordance with the teachings, fibrillated materials (e.g., in its state as a feed material) will be elongated bodies, having a length at least about 2 mm, about 5 mm, about 10 mm, about 25 mm, about 50 mm, about 75 mm, about 100 mm, about 1000 mm, about 5000 mm, about 10,000 mm, about 50,000 mm, or longer. It may have as its maximum transverse sectional dimension (e.g., a width, a diameter, or otherwise) that is smaller than the length, but greater than about 0.001 mm, about 0.005 mm, about 0.01 mm, about 0.05 mm, about 0.1 mm, about 0.5 mm, about 1 mm, about 3 mm, about 5 mm, about 10 mm, or greater. When the feed material is in a fibrillated form it may be in a form (e.g., a filament) that has a tenacity of at least about 1.0 cN/dtex, at least about 1.2 cN/dtex or even at least about 1.4 cN/dtex, as measured by ASTM D2256M-10.

A plurality of interconnected fibrillated materials may be employed as a feed material, such as a plurality of fibers in a mass that is braided, woven, wound about a core, unwoven, or otherwise. Forms of the fibrillated materials may include a coextrusion of at least two of the reaction product materials described herein, each having a differing composition and/or characteristic as compared with the other. It is possible that a core and sheath form may be employed. For example, a core may exhibit a higher glass transition temperature than the sheath. That way, a lower temperature may be employed for any deposition step.

The teachings herein are directed to a method comprising forming a reformable epoxy resin material into one or more filaments, locating the one or more filaments into printing device receptacle for receiving materials to be printed, and extruding the one or more filaments onto a substrate to form a plurality of reformable resin polymeric feed material layers. The method may further include pelletizing the formable epoxy resin material prior to forming the one or more filaments and/or heating the one or more filaments. The one or more filaments may fall below their glass transition temperature upon exposure to ambient temperature. The reformable resin polymeric feed materials may be formed into one or more adhesive filaments. The method may include co-extruding the one or more filaments with a polymeric material. The reformable resin polymeric feed material may fall below its glass transition upon contact with the substrate. A plurality of reformable resin polymeric feed materials may be extruded in an alternating order with a plurality of polymeric layers and/or adhesive layers. The shelf life of the reformable epoxy resin material may be at least about 3 months, at least about 6 months, at least about 1 year, or even at least about 5 years. The reformable resin polymeric feed materials may be recyclable. The glass transition temperature of the reformable resin polymeric feed materials may be higher than room temperature but lower than about 200° C. The reformable resin polymeric feed materials may be processed at a temperature of less than 200° C., or even less than 150° C. The reformable resin polymeric feed materials may be treated to reduce the viscosity of the filament. The reformable resin polymeric feed materials may include a difunctional epoxy resin component and an amine component. The ratio of reactants to make the reformable resin polymeric feed materials (e.g., the difunctional epoxy resin and the primary amine) may be modified to reduce the viscosity of the reformable epoxy resin material during the forming of the reformable resin polymeric feed materials into its desired form. A filament form of the reformable epoxy resin material may have a tenacity of at least about 1.0 cN/dtex, at least about 1.2 cN/dtex or even at least about 1.4 cN/dtex.

In the above additive manufacturing process, it is contemplated that a feed of the materials is delivered to at least one dispensing head for deposition onto a substrate. The at least one dispensing head and substrate are movable relative to each other. For instance, the dispensing head may be movable in at least one of the three Cartesian axes (x, y or z), and the platform moveable in at least two of the remaining axes, or vice versa. It is possible that either or both of the at least one dispensing head and substrate are moveable in all three axes. It is also possible that there may be movement of either or both of the at least one dispensing head and substrate in more than three axes, (e.g., 4, 5 or 6). Multiple feed materials may be individually supplied to a single dispensing head, or to a plurality of respective dispensing heads (e.g., a separate head for each individual fee material). Multiple dispensing heads may supply feed material to collectively make a single article. Multiple dispensing heads may supply feed material to respectively make a plurality of articles (e.g., simultaneously).

The dispensing head may include a body having an orifice penetrating through it. The body may be heated or otherwise temperature controlled. The body may have multiple portions. For example, the body may have a thermal control portion and a nozzle portion. The multiple portions may be separable from one another. The body (including any portion of it) may have a mounting portion for mounting it onto a suitable structure for causing translation of at least a portion of the body for directionally controlling deposition of feed material. Operation of the body may be controlled by an electronic processor (e.g., a programmable controller).

In another additive manufacturing process, a feed of the materials of the teachings may be delivered to a dispensing head that causes droplets including the feed material to be ejected. The feed materials may be supplied in a fibrillated or other form (e.g., as a pellet or suspended particle), heated prior to and/or within in the dispensing head to cause droplets to form and eject from the dispensing head. Ejection may be due to gravity, due to a pressurized fluid (e.g., gas), due to a vibration, any combination thereof or otherwise. The dispensing head may include a body having an orifice penetrating through it. The body may be heated or otherwise temperature controlled. The body may have multiple portions. For example, the body may have a thermal control portion and a nozzle portion. The multiple portions may be separable from one another. The body (including any portion of it) may have a mounting portion for mounting it onto a suitable structure for causing translation of at least a portion of the body for directionally controlling deposition of feed material. The body may include suitable hardware (e.g., a structure that is driven by a piezoelectric element) to apply a vibration to the droplet for causing ejection. The body may include hardware to interface with a source of gas (e.g., pressurized gas). Such hardware may employ a body defining venturi through which the gas is flowed prior to, during, and/or after a portion of gas is supplied for accelerating a droplet including the feed material.

An approach to the methods of the teachings may involve controllably delivering two or more reactants for forming a material in accordance with the teachings herein, and causing the reactants to mix and react after they each have been dispensed from a delivery device. Thus, there may be a step or reacting reactants of the teachings in an in situ reaction step. The reaction may take place before, during and/or after the reactants are dispensed onto a previously deposited layer or substrate. As with all of the methods herein, articles prepared by the method (which may be of the type described elsewhere herein (such as cavity filling articles)) may be made in accordance with the method teachings.

An approach to the methods of the teachings may involve controllably delivering solidified particulates by a cold spray technique. The particulate size and the velocity at which it is delivered shall be sufficient so that successive layers of material can be prepared with the particulates. Due to the resulting relatively high pressures experienced by particles, successively deposited layers of particles will deform and bond with each other. For example, relatively small particles (e.g., having a weight average particle size below about 100 microns (μm)) can be delivered at a temperature below their $T_g$, and at a relatively high velocity (e.g., from about 100 to 1000 meters/second) onto a substrate or a previously deposited layer. This can be repeated in a controlled manner until an article is built. Articles prepared by the above (which may be of the type described elsewhere herein) may be made in accordance with the method teachings.

An approach to the methods of the teachings may employ forming an article having two or more portions each of a dissimilar material relative to the other. Such portions may be prepared by an additive manufacturing technique or not. There may be a step of depositing one, two, three, four or more layers of the materials of the present teachings (e.g., one or more of the RER materials disclosed) by an additive manufacturing approach. The latter layer or layers may thus function as a discrete tie structure (e.g., a tie-layer) for joining the dissimilar materials that flank the layer or layers. It may also be possible that the materials of the present teachings are provided in a mixture with either or both of each of the dissimilar materials and there may be a step of depositing one, two, three, four or more layers of the mixture of materials to form such a tie structure within the present teachings. For example, it may be possible that there are steps of depositing at least one first layer of a first material; depositing at least one second layer of a second material dissimilar from the first material; and depositing an intermediate layer between the at least one first layer and the at least one second layer that includes a mixture of the reformable epoxy resin of the teachings herein and either or both of the first material or the second material. The first material and/or the second material may be dissimilar from the reformable epoxy resin.

It is also possible that any materials employed as a feed material for the teachings herein may include a mixture of one or more polymeric materials and one or more reformable epoxy resins (e.g., the latter in the form of a filler, a reinforcement or both). For example the reformable epoxy resins may be present in a mixture (by weight percent of the total material) in an amount of about 10 to about 90 percent, about 20 to about 80, about 30 to about 70 percent, or vice versa.

The methods of the teachings herein also envision the possible use of a plurality of different feed materials, two, three, four, five or more of which are different from each other feed material. For example, differences may exist in regard to chemistry, one or more thermal response characteristic (e.g., melt index, viscosity, etc.), one or more mechanical property (e.g., tensile strength, elongation, Young's modulus, compression modulus, etc.), one or more adhesive property (e.g., peel strength, shear strength, etc.) or otherwise. In this manner, it may be possible to employ the teachings for selectively constructing discrete regions in an article that vary in one or more property and/or characteristic as compared with another region of the article (e.g., an adjoining region). For example, a method may employ depositing two or more different materials within a single layer; a method may employ depositing two or more different materials in two or more adjoining layers; or both.

In more detail, the teachings contemplate a material system, which may relate to one or any combination of a method, a reaction product (which may be a polymer), or a formulated compound including the reaction product. The material system envisions a reaction of at least one diepoxide (as illustrated herein) and at least one bisphenol (as illustrated herein) under conditions (e.g., while maintaining a temperature of the reaction mixture below about 200° C. (e.g., below 195° or 190° C.)) throughout substantially the entire reaction period. For example, the amount of time that any of the reaction mixture exceeds about 200° C. is less than about 30%, about 20% or about 10% of the total reaction time. The reaction time may be the amount of time sufficient to form a reaction product having a $T_g$ as measured by differential scanning calorimetry according to ASTM E1356-08(2014) of at least about 90° C., at least about 100° C., at least about 110° C., or at least about 120° C. The $T_g$ may be below about 200° C., below about 185° or below about 170° C.

The reaction product (or the material of an article made by additive manufacturing with it) may have a relatively low $T_g$. It may be possible to have a $T_g$ below about 100° C., below about 90° C., below about 80° C., below about 70° C., below about 65° C., as measured by differential scanning calorimetry according to ASTM E1356-08(2014). The material of the present teachings may have a glass transition temperature as measured by differential scanning calorimetry according to ASTM E1356-08(2014) of at least about 45° C., at least about 55° C., or at least about 60° C. The use of such materials has the ability to enhance productivity substantially. Energy consumption can be reduced. Build times can be shortened. Still, the resulting materials could result in materials having very attractive mechanical and/or self-adhering characteristics that make it attractive for additive manufacturing builds.

A polymer or other reaction product of the present teachings may be modified to have a relatively high glass transition temperature ($T_g$), such as is described in PCT Application No. PCT/US16/61588. It may be possible to have a $T_g$ in excess of 115° C., in excess of 116° C., in excess of 117° C., in excess of 118° C., in excess of 119° C., or in excess of 120° C., as measured by differential scanning calorimetry according to ASTM E1356-08(2014). The polymer and/or reaction product of the present teachings may have a glass transition temperature as measured by differential scanning calorimetry according to ASTM E1356-08(2014) of below about 200° C., below about 185° C., or below about 170° C. The polymer and/or reaction product of the present teachings may have a glass transition temperature as measured by differential scanning calorimetry according to ASTM E1356-08(2014) of at least about 120° C., and below about 170° C.

In addition to having a relatively high $T_g$, the polymer and/or reaction product of the present teachings may also have attractive mechanical properties. For example, the polymer and/or reaction product or feed material (or any product manufactured utilizing the feed material) of the present teachings may exhibit one or any combination of the following characteristics: a stress at break (according to ASTM D638-14) of at least about 60 MPa (e.g., at least about 75 MPa), a tensile elongation at break (according to ASTM D638-14) of at least about 60 (e.g., at least about 75 MPa) and/or a modulus of elasticity (according to ASTM D638-14) of at least about 1 GPa (e.g., at least about 2.7 GPa).

In an effort to achieve such mechanical properties, it is also possible that the feed material include one or more additives. As one non-limiting example, the material may include an additive to improve (e.g., increase) the toughness of the material. Such toughening agent may include a core shell material. Such core-shell particulates may include an elastomeric core (e.g., a cross-linked rubber core). The elastomeric core, for example, may include butadiene. The elastomeric core may include a copolymer of butadiene and styrene. The elastomeric core may include a polymer having at least one silicon atom (e.g., a silicone rubber). The core shell particulates may include a shell that includes a (meth) acrylic acid, an ester thereof, and or a nitrile thereof. For example, the particulates may include a copolymer, such as a copolymer of styrene, methyl methacrylate, glycidyl methacrylate and optionally acrylonitrile. The core-shell particulates may be dispersed in a liquid suspension medium in a range of concentrations (e.g., from about 5% to about 50%, such as about 10% to about 40% by weight of the total dispersion). The core-shell particulates may be dispersed in a liquid suspension medium that may include a liquid resin, such as an epoxy based resin (e.g., diglycidyl ether of bisphenol A, diglycidyl ether of bisphenol F, a reaction product of one or both with another ingredient (such as epichlorohydrin), or any combination of these materials). Examples of commercially available core-shell particulates include those sold by Kaneka Corporation under the designation Kaneka Kane Ace, (e.g., grade 136 (dispersed as a concentrate in a diglycidyl ether of bisphenol F; and/or grade 156 (dispersed as a concentrate in a diglycidyl ether of bisphenol A). For additional guidance, the teachings of U.S. 2007/0027233 may be employed. The liquid suspension medium may be such that the particulates require no separation therefrom prior to mixing with other reactants. Thus, it is possible that the liquid suspension medium will form part of the reactants to form the resulting materials of the present teachings.

The core shell particulates may be characterized by one or more of their physical characteristics. For example, the particulates may be generally spherical. They may have an average diameter of about 0.01 micrometers to about 1 micrometers (e.g., about 0.05 to 0.2 micrometers), measured by scanning electron microscopy. Thus, the core-shell particles may be of generally nanoparticle sizes.

The core shell particulates may be employed in an amount relative to the total amount of the core shell particulates and the thermoplastic epoxy material of up to about 20 percent by weight, up to about 15 percent by weight, up to about 10 percent by weight. The core shell particulates may be employed in an amount relative to the total amount of the core shell particulates and the thermoplastic epoxy material of at least about 1 percent by weight, at least about 3 percent by weight, or at least about 5 percent by weight. Additional examples describing the use of such core shell particulates can be found in U.S. Provisional Application Ser. Nos. 62/280,934, filed Jan. 20, 2016 and 62/372,551, filed Aug. 9, 2016, the contents of these applications being hereby incorporated by reference herein for all purposes.

In connection with the preparation of the materials herein, under any approach, it is envisioned that care is taken to avoid or help minimize the occurrence of polymerization chemical reactions that are other than a reaction between hydroxyl groups from the bisphenol and the oxirane ring of the diepoxide. Moreover, desirably, steps may be employed to substantially avoid reaction of free hydroxyl groups in a branched manner, and/or to control the extent of branching by virtue of reactions with free hydroxyl groups (e.g., to form a partially cross-linked network). The reaction of the teachings herein is envisioned to result in a generally linear reaction product. The reaction of the teachings herein is envisioned to result in a reaction product that has less than amount 25% by weight of a gel, less than about 15% by weight of gel, or is substantially devoid of any gel (e.g., it is less than about 5% by weight gel), and/or has less than about 20% by weight, less than about 10% by weight, or is substantially devoid of (e.g., it has less than about 5% by weight of reaction product) of cross-linked reaction product.

By way of example, the desired proportion of starting materials may be introduced into a reaction site (e.g., a vessel) by feeding a stream of the reactants in fluidic form (e.g., as a liquid or other flowable form). Prior to and/or within the reaction site, a reaction mixture may be introduced or prepared. Heat is applied to the reaction mixture. One approach may be to employ separate feeds for each reactant. In the case when multiple feeds are employed, they may be supplied at similar or different flow rates relative to each other. Within the reaction site there may be catalyst present. An amount of the catalyst may be fixed within the reaction site, and/or it may be flowed into the reaction site. Upon exit of reaction site, the reaction product is cooled, where it will effectively solidify. It may be desired to avoid gelling during any reaction. It may be possible to achieve that by reacting at a temperature in the range of about 120-300° C. (e.g., about 130° C., about 140° C., or about 150° C. to about 200° C.) for a period of about 1 minute to about 8 hours (e.g., about 0.5 hours to about 6 hours, or about 1 to about 4 hours). The materials or reaction products of the present teachings may be prepared in bulk by batch processing, or in a continuous manner.

The polymers and reaction products of the present teachings, prepared under any approach, are envisioned to include, in an amount of at least about 50, at least about 60, at least about 70, at least about 80 or at least about 90% (by weight) (as measured by Fourier transform infrared characterization), of a generally linear backbone, thereby rendering it generally able to function as a thermoplastic material for purposes of processing, reclaiming and/or recycling.

Polymers of the teachings may employ a plurality of repeat units along the backbone. There may be at least about 15, at least about 25, or at least about 35 repeat units. There may be less than about 1000, less than about 750, less than about 500 repeat units, or less than about 250 repeat units. Polymers may have a weight average molecular weight ranging from about 1000 to about 200,000, about 5000 to about 150,000, or about 10,000 to about 100,000, as measured by gel permeation chromatography. Polymers of the teachings may have below about 50% by weight, below about 25% weight, below about 15% by weight, below about 5% weight, or below about 3% by weight of total crystallinity, as measured by differential scanning calorimetry. Polymers may have a total crystallinity of about 0 weight % or more, or about 1 weight % or more, as measured by differential scanning calorimetry. Polymers of the teachings may result in a change of crystallinity during the course of its service life in an intended application. The polymers of the teachings may have below about 50% by weight, below about 25% weight, below about 15% by weight, below about 5% weight, or below about 3% by weight of total crystallinity, as measured by differential scanning calorimetry during the entirety of its expected service life in an intended application. Polymers may have a total crystallinity of about 0 weight % or more, or about 1 weight % or more, as measured by differential scanning calorimetry during the entirety of its expected service life in an intended application. Higher crystallinity amounts are also possible for the polymer materials herein, provided that the polymer materials remain substantially devoid of an amount of cross-linking (e.g., substantially devoid of an amount of cross-linking) that would preclude processing of the material using processing techniques (e.g., extruding, molding (e.g., injection molding or otherwise)) that typically are employed to process thermoplastic materials.

It is also contemplated that the teachings may be employed to make foamed materials. A chemical and/or physical blowing agent may be incorporated which liberates gas or otherwise forms and porous structure. Sufficient foaming may occur to reduce the density of the material by at least about 10, 30, 50 or even 70%, as compared with the material density in an unfoamed state. It is possible that a blowing agent is mixed with ingredients prior to reaction of the ingredients to form the reaction products and polymers of the teachings. A foamed reaction product may thus result. It is possible that a blowing agent is mixed with ingredients prior to reaction of the ingredients to form the reaction products and polymers of the teachings. A foamed reaction product may thus result. Foaming may occur during a reacting step. It is possible that a blowing agent is mixed with ingredients after reaction of the ingredients to form the reaction products and polymers of the teachings. A foamed reaction product may thus be delayed until a predetermined condition occurs. It is possible that a blowing agent is added when the reaction product or polymer of the present teachings is blended or compounded with other ingredients for forming a compounded product.

One approach to creating a foamed material may include a step of introducing a physical and/or a blowing agent so that the resulting polymer is a foam. Suitable art-disclosed blowing agents may be employed in art-disclosed amounts. A possible approach may include a step of reacting ingredients herein in the presence of such a blowing agent. A one or two component system may be employed for creating a foamed material. The epoxy resin and the blowing agent (e.g., a carbonate, (which may be employed with or without a suitable acid), or other chemical and/or physical blowing agent) may be mixed together and optionally stored together while the esterified reaction product is isolated from them prior to reaction.

Suitable carbonates (e.g., an encapsulated carbonate (such as a metal carbonate (e.g., calcium carbonate encapsulated in a wax or polymeric coating)) may be employed, consistent with the teachings of U.S. Pat. No. 6,730,713, incorporated by reference.

The teachings herein may be free of any step of reacting an amine with any of the reaction products. The teachings herein contemplate that any of its methods may be free of any step of forming any amine adduct, and/or any reaction product is free of any amine adduct. The teachings reaction product may be a reaction product of a mixture of at least one diepoxide and at least one bisphenol in the substantial absence of any compound having a ketone moiety (e.g., any reaction used employs less than about 0.1 mol percent of any compound having a ketone moiety (e.g., 4,4'-Dihydroxybenzophenone)). The reaction temperature to achieve the materials of the present teachings may not exceed about 300°, and particularly may not exceed about 200° C. (e.g., it may not exceed 195° C., or 190° C.). The reaction product may be a reaction product of a substantially equimolar or non-equimolar mixture of at least one diepoxide and at least one bisphenol. Though examples of illustrative starting materials are provided, and a method is illustrated, the teachings also encompass a material (e.g., a polymer) prepared using other starting materials and/or by another method, to the extent that the materials have the specified composition and/or characteristics.

Materials made herein have a number of applications, and the teachings contemplate use of the materials in such applications as well as articles made with the materials and adapted for use in such applications. By way of example, the teachings herein can be employed for filling and/or structurally reinforcing a cavity (e.g., of a transportation vehicle, such as a cavity of a vehicle body frame). Thus, for example, the teachings herein contemplate articles configured for filling and/or structurally reinforcing a cavity (e.g., of a transportation vehicle, such as a cavity of a vehicle body frame) that are made by an additive manufacturing method in accordance with the present teachings. The articles of the present teachings may be a prototype part, an original equipment production part, a repair and/or replacement part. For example, the teachings herein contemplate manufacturing a repair and/or replacement part at a location (e.g., an automotive vehicle body shop or other location) as part of reconstructing a vehicle that has been damaged in a collision.

Materials herein may be employed as an adhesive. They may be employed as a structural reinforcement material. They may be employed as a material for acoustic modification, for adhesive bonding, as a film, as a powder, as a filament, in a dispersion (e.g., for use as a coating) or any combination thereof. The materials may be employed as a matrix for a composite, as a layer in a composite laminate, as an additive to a formulated composition (e.g., a structural adhesive), as an additive to a polymer system for improving or maintaining elongation and/or toughness characteristics. The materials may be employed in applications as a printable surface onto which ink is printed. The materials may be employed as part or all of a binder of an aggregate. The materials may be employed as part or all of a primer, an adhesive, and/or other surface coating. The materials may be employed in an adhesive joint. The materials may be employed in an adhesive joint between similar and/or dissimilar materials (e.g., between metals, such as one or any combination of steel, aluminum, magnesium, titanium or otherwise). The materials herein are capable of satisfying the harsh environmental and durability testing conditions known in the art (e.g., peel strength and/or shear strength in the presence of salt spray, humidity, thermal cycling, ultraviolet radiation, etc.).

Materials according to the present teachings may have a generally linear backbone and may also have at least one ether linkage in repeating units of the generally linear backbone. Materials according to the present teachings may be free of crosslinking, or of any thermoset portion chemically bonded to a generally linear backbone.

For compounds described herein that contain one or more aryl moiety (e.g., phenyl) the moiety may be substituted or unsubstituted. For example, when a substituted moiety is employed it may have an alkyl (e.g., a C1-C12 alkyl), aryl, and/or cyclohexyl substituent.

The reaction mixtures of the teachings herein may include polycyclic aromatic hydrocarbon (e.g., a fluorene). Such polycyclic aromatic hydrocarbon (e.g., a fluorene) may be employed in addition to, or lieu of some or all of the diepoxide, the bisphenol or both, of the present teachings.

The teachings herein also contemplate formulations that include a mixture of a material of the teachings with one or any combination of a filler (e.g., an organic filler, an inorganic filler or both), a reinforcement (e.g., a fiber, such as an organic fiber, an inorganic fiber (e.g., carbon fiber, metal fiber, ceramic fiber (such as glass), or both), a curing agent, a colorant, a light stabilizer, a chain terminator and/or other additive (e.g., as described in Col. 6 of U.S. Pat. No. 6,803,004) a processing aid, a flame retardant, such as a phosphorus containing flame retardant (e.g., as described in U.S. patent application Ser. No. 62/208,236, Filed Aug. 21, 2015 (incorporated by reference)), or otherwise. For possible ingredients, see e.g., U.S. Pat. Nos. 5,648,401, and 6,730,713, both incorporated by reference. An example of a possible filler that may be employed is described in United States Patent Application Publication No. 20090298974, and may include fibers or particles of naturally occurring organic materials, such as wood flour (incorporated by reference; see, e.g., paragraphs [0031]-[0032]). Thus, use of the teachings herein may result in a material that exhibits sufficient flame retardancy to meet one or more of the requirements for demonstrating flame retardancy (e.g., to meet vertical burn and/or smoke density requirements (or some other requirement) as set forth in 14 C.F.R. § 25.853 and 14 C.F.R. § 25.856 (the United States Code of Federal Regulations for compartment interiors, including but not limited to 14 C.F.R. § 25.853(a), and the referenced Appendix F and procedures referenced therein), all of which are incorporated by reference for all purposes).

As used herein, "difunctional" refers to having two reactive groups. A "diepoxide" refers to a compound having two epoxide functionalities.

As used herein, "substantially devoid of any cross-linking" or a "substantial absence of cross-linking" refers to a condition in which a mass of material (e.g., a feed material and/or a resulting article) has only a minor degree of cure, (e.g., below about 25%, below about 15%, or below about 5%) as exemplified by a relatively minimal exotherm peak (if any) displayed when measured by different scanning calorimetry (DSC methods), for example, as compared with an exotherm peak for conventional thermoset epoxy material during curing, or otherwise in accordance with art-disclosed methods, such as in Sichina, Characterization of Epoxy Resins Using DSC, Application Note (PerkinElmer 2000).

As used herein, unless otherwise stated, the teachings envision that any member of a genus (list) may be excluded from the genus; and/or any member of a Markush grouping may be excluded from the grouping. When the use of "a" is employed herein, unless otherwise specified, or it is clear from the text, "a" envisions one or more. Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. For example, unless otherwise stated, in the context of the present teachings, a combination described as consisting essentially of any particular elements may permit for the presence of other elements, components, ingredients or steps that do not alter a $T_g$ of a material by +/−3° C. as compared with a material without such elements, components, ingredients, or steps. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A feed material system for preparing an article by additive manufacturing, the feed material system comprising:
   an additive manufacturing apparatus;
   one or more preform elements of a feed material, wherein the feed material is:
   (i) formed of a reformable resin polymeric material that is a reaction product of a catalyzed reaction in the presence of triphenylphosphine, and that has a polymer backbone having a plurality of repeat units each having ether linkages, and one or more pendant hydroxyl moieties; and
   (ii) capable of transforming from a generally non-tacky first state to a second state in which the feed material is softened, upon application of heat, relative to the generally non-tacky first state and is at least partially tacky in the second state to permit the feed material to adhesively bond to a surface upon which the feed material is deposited for forming a layer on the surface, to a third state in which the feed material is harder than when in the second state but remains able to further soften upon application of heat; and
   a rotatable reel capable of substantially continuously supplying the feed material during deposition of successive layers in a layer-by-layer build-up of the article in the additive manufacturing; and
   wherein a resulting adhesive bond is substantially devoid of any cross-linking between the layer and the surface;
   wherein the one or more preform elements of the feed material are in a fibrillated form carried on the rotatable reel and adapted to be dispensed by the additive manufacturing apparatus; and
   wherein the reformable resin polymeric material is adapted to act as a tie-layer between layers of dissimilar materials in the article made by the additive manufacturing;
   wherein the reformable resin polymeric material is a reaction product of diglycidyl ether of bisphenol A and at least one bisphenol; and
   wherein the at least one bisphenol is 4,4'-(1-phenylethylidene) bisphenol.

2. The feed material system of claim 1, wherein the at least one bisphenol is a combination of the 4,4'-(1-phenylethylidene) bisphenol and bisphenol S (4,4'-sulfonylbisphenol).

3. The feed material system of claim 1, wherein the reformable resin polymeric material exhibits a glass transition temperature, as measured by differential scanning calorimetry according to ASTM E1356-08(2014), of from about 60° C. to about 90° C.

4. The feed material system of claim 1, wherein the reformable resin polymeric material exhibits a glass transition temperature, as measured by differential scanning calorimetry according to ASTM E1356-08(2014), of at least about 90° C.

5. The feed material system of claim 1, wherein the feed material comprises a sheath disposed around a core; and wherein the feed material is fabricated by a coextrusion of the sheath and the core.

6. The feed material system of claim 5, wherein the feed material is in the fibrillated form and is dimensioned and configured so that the deposition of successive layers through a heated die results in the core being subjected to a temperature below the $T_g$ of the feed material.

7. The feed material system of claim 6, wherein adjoining elements of the feed material in a pre-deposition state are separable from each other, up to a temperature of at least about 40° C., with substantially no cohesive failure of any of the adjoining elements.

8. The feed material system of claim 5, wherein the core exhibits a higher $T_g$ than the sheath.

9. The feed material of claim 1, wherein the reaction product or the article exhibits one or any combination of the following characteristics:
 a tensile strength at yield, according to ASTM D638-14, of at least about 15 MPa;
 a tensile elongation strength at break, according to ASTM D638-14, of at least about 40 MPa;
 an elongation at break, according to ASTM D638-14, of at least about 15%; and
 a tensile modulus of elasticity, according to ASTM D638-14, of at least about 0.5 GPa.

10. The feed material system of claim 1, wherein the diglycidyl ether of bisphenol A and the at least one bisphenol are reacted, in molar amounts, in a ratio of the diglycidyl ether of bisphenol A to the at least one bisphenol of about 4:1 to about 1:4.

11. The feed material system of claim 1, wherein the diglycidyl ether of bisphenol A and the at least one bisphenol are reacted, in molar amounts, in a ratio of the diglycidyl ether of bisphenol A to the at least one bisphenol of about 4:1 to about 1:4, excluding 1:1.

12. The feed material system of claim 1, wherein the reaction product is of a substantially non-equimolar mixture of the diglycidyl ether of bisphenol A and the at least one bisphenol.

13. The feed material system of claim 1, wherein the reformable resin polymeric material includes a polycyclic aromatic hydrocarbon.

14. A method of making a three-dimensional article, comprising:
 (a) depositing a first layer onto a substrate, the first layer being made of a first reformable resin polymeric feed material that is a reaction product of a catalyzed reaction in the presence of triphenylphosphine, and that has a polymer backbone having a plurality of repeat units each having ether linkages, and one or more pendant hydroxyl moieties;
 (b) depositing a second layer onto the first layer, the second layer being made of a second reformable resin polymeric feed material that has a polymer backbone having a plurality of repeat units each having ether linkages, and one or more pendant hydroxyl moieties, the second reformable resin polymeric feed material being the same as, or different from, the first reformable resin polymeric feed material; and
 (c) thereafter repeating step (a), step (b), or both steps for consecutively depositing a plurality of additional discrete layers of the first reformable resin polymeric feed material, the second reformable resin polymeric feed material, or both, until the three-dimensional article is formed;
 wherein the first reformable resin polymeric feed material, the second reformable resin polymeric feed material, or both include a reaction product of diglycidyl ether of bisphenol A and at least one bisphenol; and
 wherein the at least one bisphenol is 4,4'-(1-phenylethylidene) bisphenol.

15. The method of claim 14, wherein the first reformable resin polymeric feed material, the second reformable resin polymeric feed material, or both are a polymeric material.

16. The method of claim 15, wherein the step of depositing the second layer is performed by feeding a fibrillated form of the second reformable resin polymeric feed material through a die head and heating at least a portion of the fibrillated form to a temperature above the $T_g$ of the second reformable resin polymeric feed material; wherein at the time the heated portion contacts a previously deposited layer, the heated portion is at a temperature higher than the $T_g$ of the second reformable resin polymeric feed material.

17. The method of claim 14, wherein any of the depositing steps are performed by feeding a fibrillated form of the first or second reformable resin polymeric feed materials through a die head and heating at least a portion of the fibrillated form to a temperature above the $T_g$ of the first or second reformable resin polymeric materials, respectively.

18. The method of claim 17, wherein the fibrillated forms of the first and second reformable resin polymeric feed materials have a tenacity of at least about 1.0 cN/dtex, as measured by ASTM D2256M-10.

19. A feed material system for preparing an article by additive manufacturing, the feed material system comprising:
 an additive manufacturing apparatus;
 one or more preform elements of a feed material, wherein the feed material is:
  (i) formed of a reformable resin polymeric material that is a reaction product of a catalyzed reaction and that has a polymer backbone having a plurality of repeat units each having ether linkages, and one or more pendant hydroxyl moieties; and
  (ii) capable of transforming from a generally non-tacky first state to a second state in which the feed material is softened, upon application of heat, relative to the generally non-tacky first state and is at least partially tacky in the second state to permit the feed material to adhesively bond to a surface upon which the feed material is deposited for forming a layer on the surface, to a third state in which the feed material is harder than when in the second state but remains able to further soften upon application of heat; and
 a rotatable reel capable of substantially continuously supplying the feed material during deposition of successive layers in a layer-by-layer build-up of the article in the additive manufacturing; and
wherein the reformable resin polymeric material is a reaction product of diglycidyl ether of bisphenol A and 4,4'-(1-phenylethylidene) bisphenol.

20. The feed material system of claim 19, wherein the reaction product is formed of a catalyzed reaction in the presence of triphenylphosphine.

* * * * *